(12) United States Patent
Meyer et al.

(10) Patent No.: US 10,727,650 B2
(45) Date of Patent: Jul. 28, 2020

(54) ARRANGEMENT OF STACK SPARK GAPS AND DEVICE FOR HOLDING TOGETHER AND ELECTRICALLY CONTACTING STACK SPARK GAPS

(71) Applicant: Phoenix Contact GmbH & Co. KG, Blomberg (DE)

(72) Inventors: Thomas Meyer, Ottenstein (DE); Hannes Sagebiel, Hameln (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 16/530,663

(22) Filed: Aug. 2, 2019

(65) Prior Publication Data

US 2020/0044419 A1    Feb. 6, 2020

(30) Foreign Application Priority Data

Aug. 3, 2018  (DE) .................. 10 2018 118 904

(51) Int. Cl.
*H02H 9/06* (2006.01)
*H01R 4/38* (2006.01)
(Continued)

(52) U.S. Cl.
CPC .............. *H01T 4/06* (2013.01); *H01R 4/38* (2013.01); *H01T 4/18* (2013.01); *H02H 9/06* (2013.01)

(58) Field of Classification Search
CPC .......... H01T 4/00–20; H02H 9/04–045; H02H 9/048–06; H01R 4/38
See application file for complete search history.

(56) References Cited

U.S. PATENT DOCUMENTS

| 4,320,436 A * | 3/1982 | Bushnell .................. H01T 4/06 337/34 |
| 2004/0160723 A1* | 8/2004 | Wittmann ................ H01T 4/06 361/118 |

(Continued)

FOREIGN PATENT DOCUMENTS

| DE | 202013102647 U1 | 6/2013 |
| DE | 102013113614 A1 | 6/2015 |

(Continued)

*Primary Examiner* — Thienvu V Tran
*Assistant Examiner* — Christopher J Clark
(74) *Attorney, Agent, or Firm* — David S. Safran; Roberts Calderon Safran & Cole, P.C.

(57) ABSTRACT

An arrangement of stack spark gaps, whereby a stack spark gap has multiple electrodes and insulating elements that are arranged between the electrodes, with a first electrically conductive clamping element and a second electrically conductive clamping element, whereby the two clamping elements are arranged opposite to the front ends of the stack spark gaps, with at least one connecting element, by which the two clamping elements are connected to one another, and with connection elements for electrical connection to the stack spark gaps. A device is provided for holding the stack spark gaps together and having them make contact. Three stack spark gaps are arranged beside one another between the two clamping elements, at least one of which is electrically conductive, and the two clamping elements are connected to one another electrically via the connecting element and are arranged with the spark gaps so as to form a star circuit.

16 Claims, 8 Drawing Sheets

(51) Int. Cl.
*H01T 4/06* (2006.01)
*H01T 4/18* (2006.01)

(56) References Cited

U.S. PATENT DOCUMENTS

| | | | | |
|---|---|---|---|---|
| 2015/0349523 A1* | 12/2015 | Tsovilis | ........... | H01C 1/022 |
| | | | | 361/56 |
| 2016/0276821 A1* | 9/2016 | Politis | ........... | H02H 9/02 |
| 2020/0044420 A1* | 2/2020 | Meyer | ........... | H01T 4/02 |
| 2020/0044442 A1* | 2/2020 | Meyer | ........... | H01R 4/38 |

FOREIGN PATENT DOCUMENTS

| | | |
|---|---|---|
| DE | 202014101167 U1 | 6/2015 |
| WO | 2016169841 A1 | 10/2016 |
| WO | 2017080825 A1 | 5/2017 |

* cited by examiner

ARRANGEMENT OF STACK SPARK GAPS AND DEVICE FOR HOLDING TOGETHER AND ELECTRICALLY CONTACTING STACK SPARK GAPS

BACKGROUND OF THE INVENTION

Field of the Invention

The invention relates to an arrangement of stack spark gaps, whereby a stack spark gap has multiple electrodes and insulating elements that are arranged between the electrodes, with a first electrically conductive clamping element and a second electrically conductive clamping element, whereby the two clamping elements are arranged opposite to the front ends of the stack spark gaps, with at least one connecting element, by which the two clamping elements are connected to one another, and with connection elements for electrical connection of the stack spark gaps. In addition, the invention relates to a device for holding stack spark gaps together and having them make contact.

Description of the Related Art

Stack spark gaps per se have been known for many years from the state of the art, typically from the area of surge protection. Here, the stack spark gaps provide the surge diverter, which when a threshold voltage is exceeded—in equipment protection, generally a voltage above the operational voltage of a connected device but below the insulation strength with regard to surge voltages of this device—becomes conductive in fractions of a second and thus diverts the surge that is triggered. The stack spark gaps consist of multiple electrodes and multiple insulators, which are arranged between the individual electrodes, so that in each case, an insulator is located between two electrodes, which insulator has an opening in the center, so that two electrodes form a spark gap. The electrodes in most cases are designed as graphite disks; the insulators in most cases are produced as insulating films made of plastic.

In order to hold together the individual electrodes of a stack spark gap, it is known to clamp the electrodes and insulating elements between two clamping elements, whereby the clamping elements are connected to one another via a connecting element.

Moreover, it is known from the state of the art to connect to one another multiple stack spark gaps in the form of a star circuit—in the case of three stack spark gaps, also called a Y-connection. The stack spark gaps are then connected to one another, so that all stack spark gaps are interconnected in each case with a connection, namely in the star point, whereby the respective other connection of any stack spark gap uses an external connection. Then consequently, two stack spark gaps are always connected in series between two external connections. Such arrangements are used, for example, for the protection of direct voltage systems, in particular for the protection of photovoltaic units.

In a surge protection device that is known to the applicant from experience, the stack spark gaps are embedded in a plastic housing and are connected to one another via metal plates, which are guided crosswise by guides in the plastic housing. It is disadvantageous in the known arrangement that tensile forces that arise in the case of overvoltage have to be taken up by the housing, which results in twisting. Moreover, the number of individual electrodes of a stack spark gap is limited by the size of the recesses in the plastic housing, in which the stack spark gaps are accommodated.

SUMMARY OF THE INVENTION

The object of the invention is accordingly to provide an arrangement of stack spark gaps, in which the above-mentioned drawbacks are eliminated at least to a large extent.

In the case of the arrangement according to the invention, the object is achieved in that, first, three stack spark gaps are arranged beside one another between the two clamping elements. In this case, the stack spark gaps are preferably also oriented parallel to one another. In addition, the at least one connecting element is electrically conductive. As a result of both the connecting element and the clamping elements that are connected to one another by the connecting element being electrically conductive, the two clamping elements are connected to one another electrically via the connecting element.

Each of the stack spark gaps of the arrangement according to the invention is connected on a front end that is used as a connection side in an electrically conductive manner to one connection element in each case. Moreover, an insulator is arranged between the connection side of any stack spark gap and the clamping element that is arranged on the connection side, so that the connection side of the stack spark gap is insulated electrically from the associated, i.e., the adjacent, clamping element. The front end of any stack spark gap that is opposite to the connection side is connected in an electrically conductive manner to the clamping element that is arranged on this front end. Each stack spark gap is thus connected to a clamping element in an electrically conductive manner and is arranged electrically insulated from the other clamping element, so that altogether, the three stack spark gaps form a star circuit. In the arrangement according to the invention, the middle potential—the star point—is thus formed by the two clamping elements and the at least one connecting element.

The arrangement according to the invention thus combines with one another in an elegant way the mechanical attachment of the stack spark gaps and the making of electrical contact of the stack spark gaps in the form of a star circuit, namely a Y-connection. As a result of the individual stack spark gaps being arranged, in particular clamped, between two clamping elements and the two clamping elements being connected to one another by the connecting element, a flexibility is produced in a simple way in the number of electrodes and insulating elements of a stack spark gap, since the connecting element optionally can be matched to the length of the stack spark gaps. In the event of overvoltage, tensile forces that develop are taken up by the clamping elements and the connecting elements.

It is especially advantageous for a user when not all three connection elements of the stack spark gaps are arranged on one side of the arrangement. In particular, such an arrangement is advantageous in which two connection elements are on one side of the arrangement and one connection element is on the opposite side of the arrangement. A preferred configuration of the arrangement according to the invention is accordingly further wherein the stack spark gaps are arranged between the clamping elements in such a way that the connection sides of two stack spark gaps are facing the first clamping element, and the connection side of the third stack spark gap is facing the second clamping element. The front ends of two stack spark gaps that are opposite to the connection sides are then connected to the second clamping element in an electrically conductive manner, and the front end of the third stack spark gap that is opposite to the connection side is then connected to the first clamping element in an electrically conductive manner. Furthermore, it is especially advantageous when the two outer stack spark gaps are arranged identically. Accordingly, the center stack spark gap is preferably the third stack spark gap, which is insulated electrically from the first clamping element and which is connected to the second clamping element in an electrically conductive manner via the front end that is opposite to the connection side. In this way, the distance between the two connection elements that are arranged on one side of the arrangement can be kept as large as possible.

The insulators that are arranged between the connection sides of the stack spark gaps and the clamping elements can preferably be produced by respectively one separate insulator. In particular, these individual insulating plates can, for example, be made of plastic. In order to significantly reduce the installation cost, however, it is first provided—in a quite especially advantageous configuration of the arrangement according to the invention, in which two connection sides of two stack spark gaps are facing the first clamping element and a connection side of a stack spark gap is facing the second clamping element—that the two insulators are produced between the first clamping element and the stack spark gaps as a common insulating element. The arrangement according to the invention is then wherein in each case, an insulating element is arranged on the sides of the clamping elements that face the front ends, whereby a recess is formed in the first insulating element, by which recess a front end of a stack spark gap is connected to the first clamping element, and whereby two recesses are formed in the second insulating element, by which recesses the front ends of the two other stack spark gaps are connected to the second clamping element.

In this way, an especially simple installation of the arrangement is possible.

More preferably, the insulating elements are designed like a frame, whereby the outside contour of the insulating elements is matched to the outside contour of the clamping elements. Moreover, on the edges, the insulating elements preferably at least partially project beyond the clamping elements.

In order to contact the stack spark gaps on the front ends in an especially elegant electrically conductive manner with the clamping elements, in a preferred embodiment of the arrangement according to the invention, a contact element is arranged in each case on the front ends of the stack spark gaps that are connected to the clamping elements in an electrically conductive manner. The contact element is connected to the adjoining electrode of the stack spark gap in an electrically conductive manner. Thus, the adjoining electrode is the terminal electrode of the stack spark gap. The contact element is then also connected to the corresponding clamping element.

The contact is made preferably in an especially simple way via a pure pressure contact, namely in that the stack spark gaps are clamped between the clamping elements.

If insulating elements are provided with recesses, then the contact elements are more preferably arranged in the recesses. In particular, the contact element on the side that faces the stack spark gaps is flush with the insulating element or projects beyond the insulating element.

As described above, connection elements for contacting the stack spark gaps are arranged on the connection sides of the individual stack spark gaps. In one configuration, the connection elements in each case have a contact area and a connection area. Each connection element is then connected in an electrically conductive manner via its contact area to the adjoining electrode of the stack spark gap.

In another preferred configuration of the arrangement according to the invention, the connection area of any connection element is guided through in each case a corresponding opening in the insulator on the side of the clamping element that faces away from the stack spark gaps. In this case, the connection area or the connection element does not contact the clamping element. This can preferably be ensured in that the insulator extends into the area of the opening and in particular covers the border of the opening. In the configurations in which the insulators are produced by the insulating elements, the openings in the insulating elements are made in a corresponding manner.

According to the invention, the two clamping elements are connected to one another via at least one connecting element. In order to further improve the stability of the arrangement, it is provided in a preferred configuration that the two clamping elements are connected to one another via multiple connecting elements. For the way the arrangement according to the invention functions, it is sufficient for one of the connecting elements to be electrically conductive in order to connect the two clamping elements to one another electrically. It is preferable, however, when multiple, in particular all, connecting elements are electrically conductive. The connecting elements are more preferably designed as screws or as bolts. Moreover, recesses are formed in the clamping elements and/or in the insulators, through which recesses the connecting elements at least partially extend.

In addition to the arrangement of stack spark gaps, the invention also relates to a device for holding together and electrically contacting stack spark gaps. The device has a first electrically conductive clamping element and a second electrically conductive clamping element, between which the stack spark gaps that consist of multiple electrodes and insulators can be clamped. The two clamping elements are arranged opposite to one another in a corresponding manner. Moreover, the clamping elements are connected to one another by a connecting element.

According to the invention, it is now provided that the clamping elements are designed in such a way that three stack spark gaps can be positioned beside one another between the two clamping elements, and namely in such a way that the front ends of the stack spark gaps point to the clamping elements. The stack spark gaps can preferably be positioned parallel to one another between the clamping elements. The connecting element, with which the clamping elements are connected to one another, is electrically conductive. Since the clamping elements are also electrically conductive, this results in that the two clamping elements are connected to one another in an electrically conductive manner via the connecting element.

Two insulators are also arranged on the first clamping element of the device according to the invention. The insulators are arranged on the clamping element in such a way that two of the stack spark gaps can be arranged with a front end against the first clamping element in an insulating manner. An insulator is arranged on the second clamping element. As a result, the third stack spark gap can be arranged with a front end against the second clamping element in an insulating manner.

The device according to the invention is thus designed in such a way that three stack spark gaps, on the one hand, are held together and, moreover, can be held arranged beside one another in an elegant manner, and, on the other hand, are contacted in a special way. One stack spark gap is contacted via the first clamping element; two stack spark gaps are contacted via the second clamping element. Since, moreover, the two clamping elements are connected to one another electrically, the device according to the invention opens up an elegant possibility of connecting stack spark gaps to one another in a star circuit. To this end, the device itself forms the middle potential.

An especially advantageous configuration of the device according to the invention is distinguished in such a way that the two insulators that are arranged on the first clamping element are produced by a common first insulating element. The insulator that is arranged on the second clamping element is produced by a second insulating element. In this way, the installation cost is reduced, since fewer parts have to be installed, when two insulators are produced by a single insulating element.

Especially advantageously, the insulators or insulating elements are designed as previously described in connection with the arrangement according to the invention. All statements made in connection with the arrangement as well as all configurations of the insulators and insulating elements apply with all described features in a corresponding manner for the device for holding stack spark gaps together and having them make contact according to the invention.

The features that relate to the configurations of the connecting element and the clamping element and have been implemented in connection with the arrangement according to the invention also apply in a corresponding manner for the device according to the invention.

In another configuration, a contact element for contacting a stack spark gap is arranged on the first clamping element, and two contact elements for contacting two stack spark gaps are arranged on the second clamping element. If the insulating elements according to the invention with the corresponding recesses are arranged on the clamping elements, then the contact elements are configured and arranged on the clamping elements in such a way that they are arranged in the recesses of the insulating element. The outside contours of the contact elements are especially preferably matched to the outside contours of the recesses.

In general, there are a large number of possibilities for further developing and configuring the arrangement of stack spark gaps according to the invention and the device for holding stack spark gaps together and having them make contact. To this end, reference is made the description of preferred embodiments in conjunction with the accompanying drawings.

DETAILED DESCRIPTION OF THE INVENTION

Figure 1:
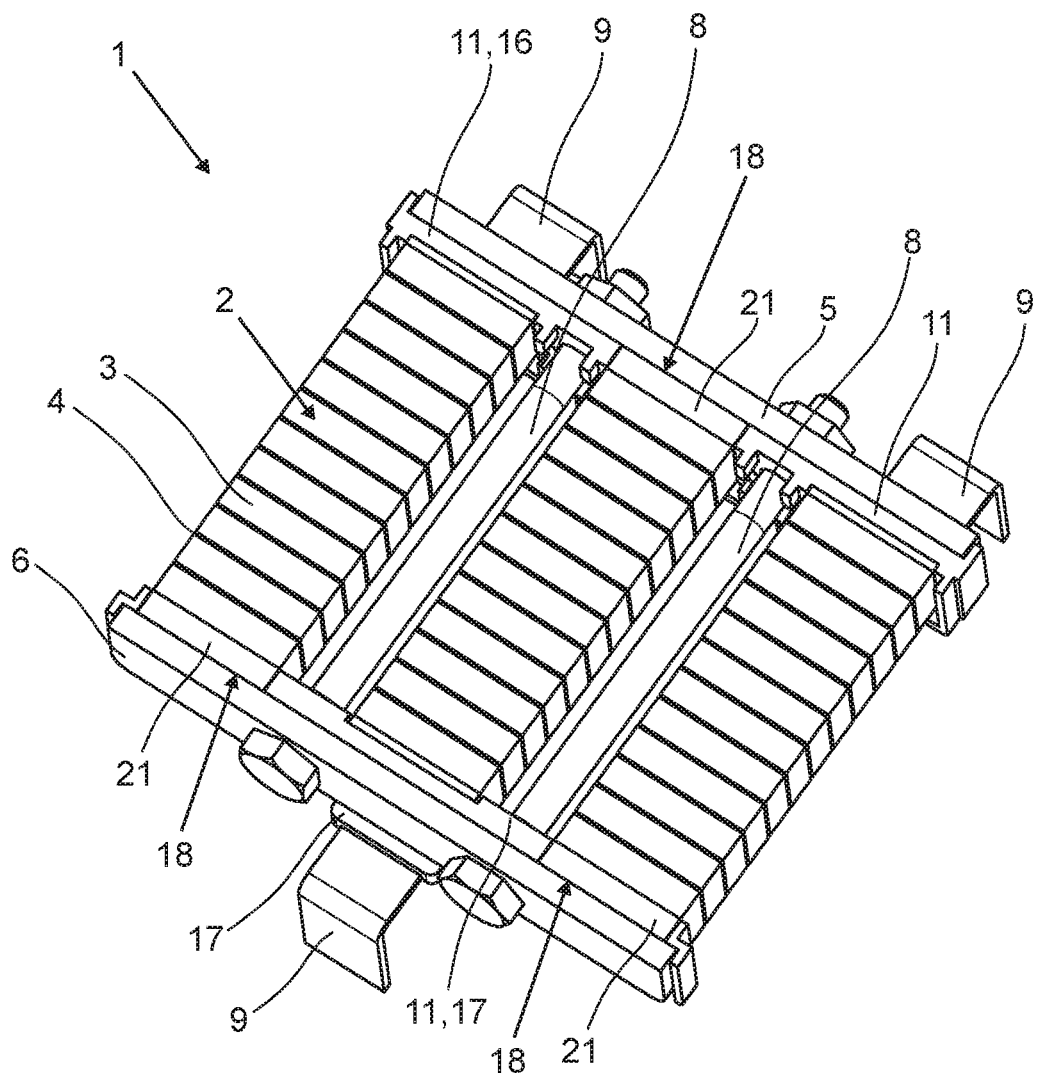
FIG. 1 is a perspective view of an arrangement of stack spark gaps.

FIG. 1 shows a sectional view through an arrangement 1 of stack spark gaps 2. The arrangement 1 comprises three stack spark gaps 2, whereby each stack spark gap 2 is built up of multiple electrodes 3 and insulating elements 4 that are arranged between the electrodes 3. The stack spark gaps 2 are clamped between a first clamping element 5 and a second clamping element 6. Moreover, the stack spark gaps 2 are arranged beside one another in a parallel manner. The two clamping elements 5, 6 are arranged opposite to one another on the ends 7 (FIG. 5) of the stack spark gaps 2 and are also connected to one another via connecting elements 8. In the perspective view, two connecting elements 8 are visible. The clamping elements 5, 6 and the connecting elements 8 are electrically conductive, in such a way that the two clamping elements 5, 6 are connected to one another electrically via the connecting elements 8.

Figure 5:
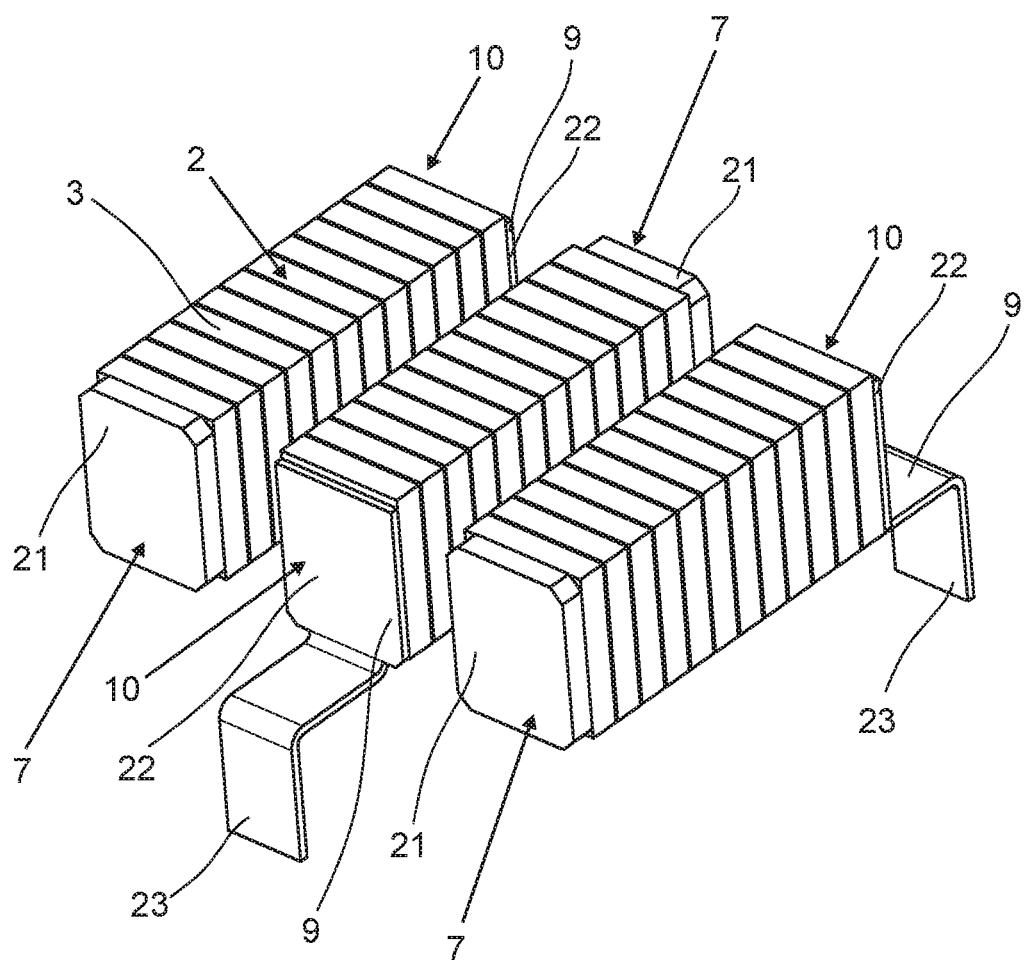
FIG. 5 is a perspective view of three stack spark gaps.

Each stack spark gap 2 can be connected via a connection element 9, whereby the whereby the connection elements 9 are arranged on the ends of the stack spark gaps 2 that are used as connection sides 10 (FIG. 5).

The arrangement 1 is designed overall in such a way that an insulator 11 is arranged between the connection sides 10 of the stack spark gaps 2 and the clamping element 5, 6 that is arranged on the respective connection side 10. As a result, the connection sides 10 of the stack spark gaps are insulated electrically from the corresponding clamping elements 5, 6.

The front end 7, i.e., the end opposite to the end on the connection side 10 at which the respective connection element 9 is connected, of any stack spark gap 2 is connected in an electrically conductive manner to the clamping element 5, 6 that is arranged on the front end 7. Each individual stack spark gap 2 is thus connected to a clamping element 5, 6 in an electrically conductive manner and is arranged, moreover, opposite to the other clamping element 5, 6 in an insulating manner. By this configuration, it is achieved that the stack spark gaps 2 form a star circuit. The clamping elements 5, 6 and the connecting elements 8 in this case form the middle potential.

The two outer stack spark gaps 2 face the first clamping element 5 with their connection sides 10 and accordingly connect to the second clamping element 6 in an electrically conductive manner. The center stack spark gap 2 faces the second clamping element 6 with its connection side 10 and accordingly connects to the first clamping element 5 in an electrically conductive manner. A preferred arrangement of the connection elements 9 is thus produced, since two connection elements 9 lie on one side of the arrangement 1, and a connection element 9 lies in the center on the other side of the arrangement 1.

Altogether, it is achieved by the arrangement 1 that there are always two stack spark gaps 2 between two connection elements 9 and thus two conductors, to which the arrangement 1 is connected via the connection elements 9. In the case where the stack spark gaps 2 are conductive, the following current path is thus produced:

Via the connection element 9, through a stack spark gap 2, through the clamping element 5, 6, with which the stack spark gap 2 is connected in an electrically conductive manner, via the connecting element 8, via the opposite clamping element 5, 6, through the stack spark gap 9 that is connected with this clamping element 5, 6 in an electrically conductive manner to the connection element 9 that is arranged on this stack spark gap.

Figure 2:
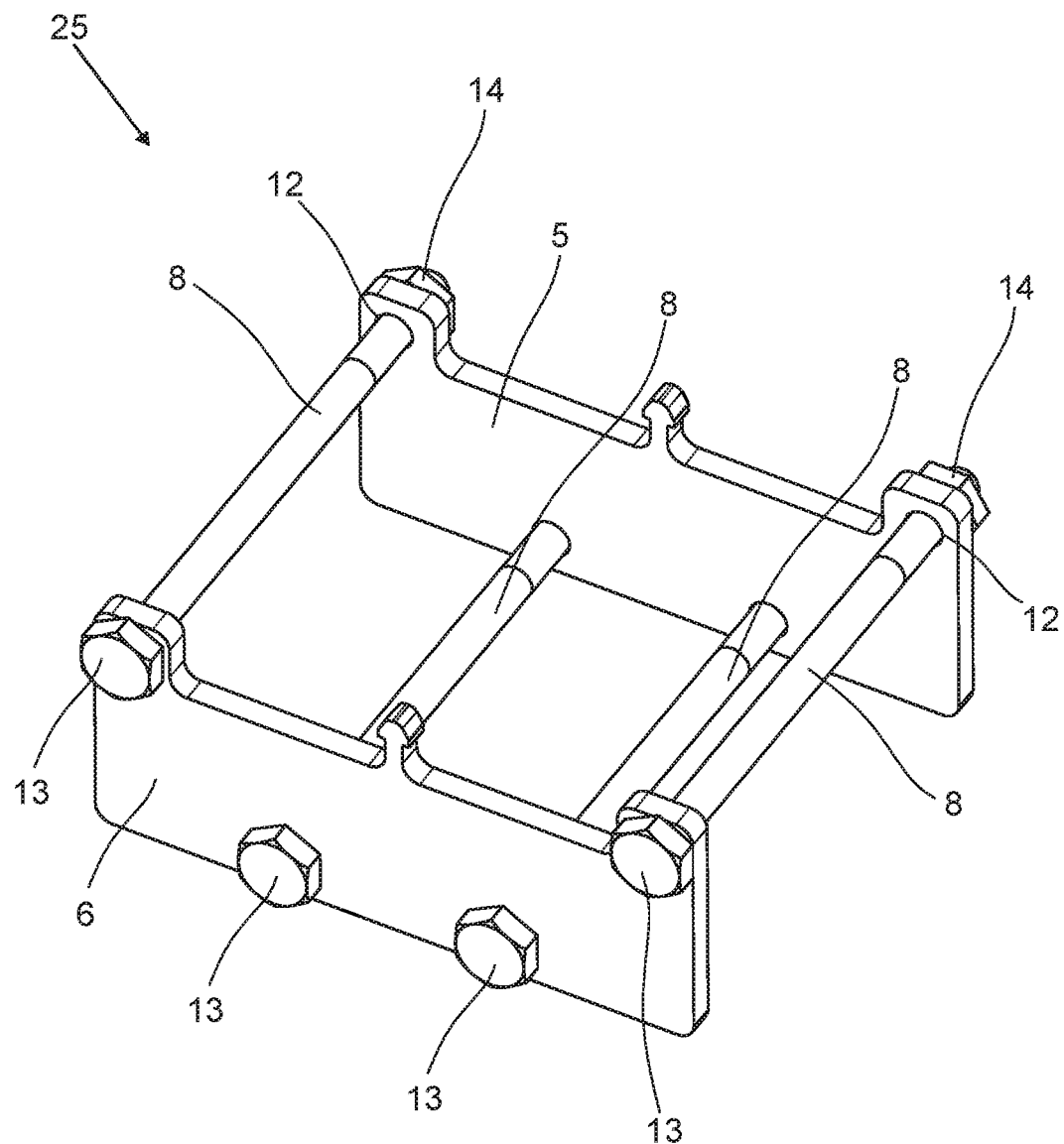
FIG. 2 is a perspective view of a first configuration of a device for holding stack spark gaps together and having them make contact.

FIG. 2 shows the first electrically conductive clamping element 5 and the second electrically conductive clamping element 6, which are connected to one another via four electrically conductive connecting elements 8 and form the middle potential of the arrangement 1. The connecting elements 8 are produced as screws and are guided from the exterior of the second clamping element 6 through recesses 12 in the clamping elements 5, 6 on the exterior of the first clamping element 5. The screw heads 13 thus lie on the exterior of the second clamping element 6, while the screws are attached by screw nuts 14 to the exterior of the first clamping element 5. By using multiple connecting elements 8, the stability of the arrangement 1 is increased. As is evident in FIG. 2, moreover, heads 13 are made on the clamping elements 5, 6.

Figure 3:
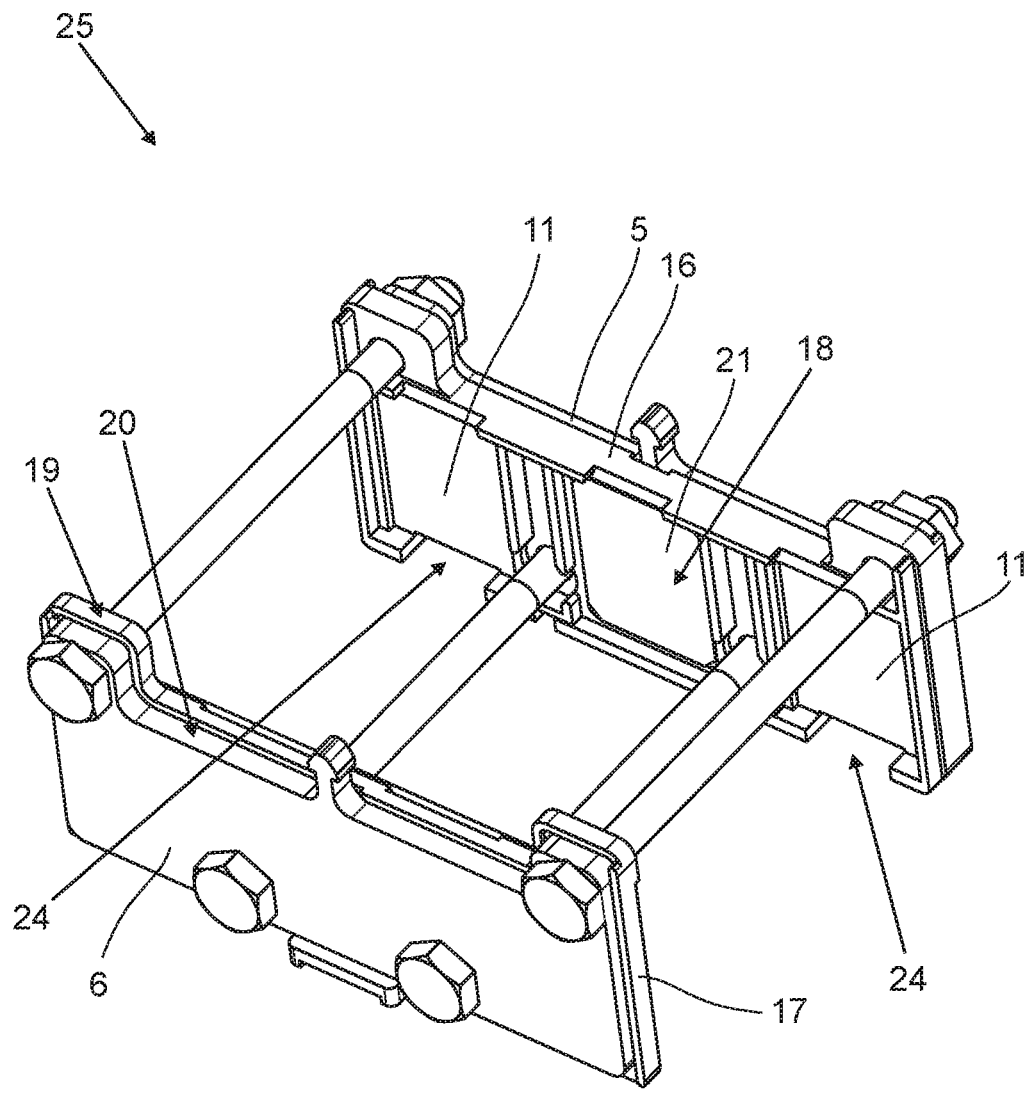
FIG. 3 is a perspective view of a second configuration of a device for holding stack spark gaps together and having them make contact.

FIG. 3 shows a configuration in which the insulators 11, with which the connection sides 10 of the stack spark gaps 2 are electrically insulated relative to the clamping elements 5, 6, are made by insulating elements 16, 17. A first insulating element 16 is arranged on the side of the first clamping element 5 that faces the front ends 7 of the stack spark gaps 2. The insulating element 16 completely coats the clamping element 5 with the exception of a recess 18 that is formed in the center in the insulating element 16. Because of the recess 18, the front end 7 of the stack spark gaps 2 that are arranged in the center can be connected to the clamping element 5 in an electrically conductive manner, while the connection sides 10 of the two outer stack spark gaps 2 are insulated electrically from the clamping element 5 by the insulating element 16. A second insulating element 17 is arranged on the side of the second clamping element 6 that faces the front ends 7 of the stack spark gaps 2. The insulating element 17 has two recesses 18, which are formed in the insulating element 17 in such a way that the front ends 7 of the two outer stack spark gaps 2 can be connected in an electrically conductive manner to the second clamping element 6 through the recesses 18. The recesses 18 can be seen in FIG. 1.

The insulating elements 16, 17 have the shape of a frame. The outside contour 19 of the insulating elements 16, 17 is matched to the outside contour 20 of the clamping elements 5, 6. Altogether, the insulating elements 16, 17 are designed in such a way, however, that they project on the edges somewhat beyond the clamping elements 5, 6, so that a reliable insulation is ensured.

Figure 4A:
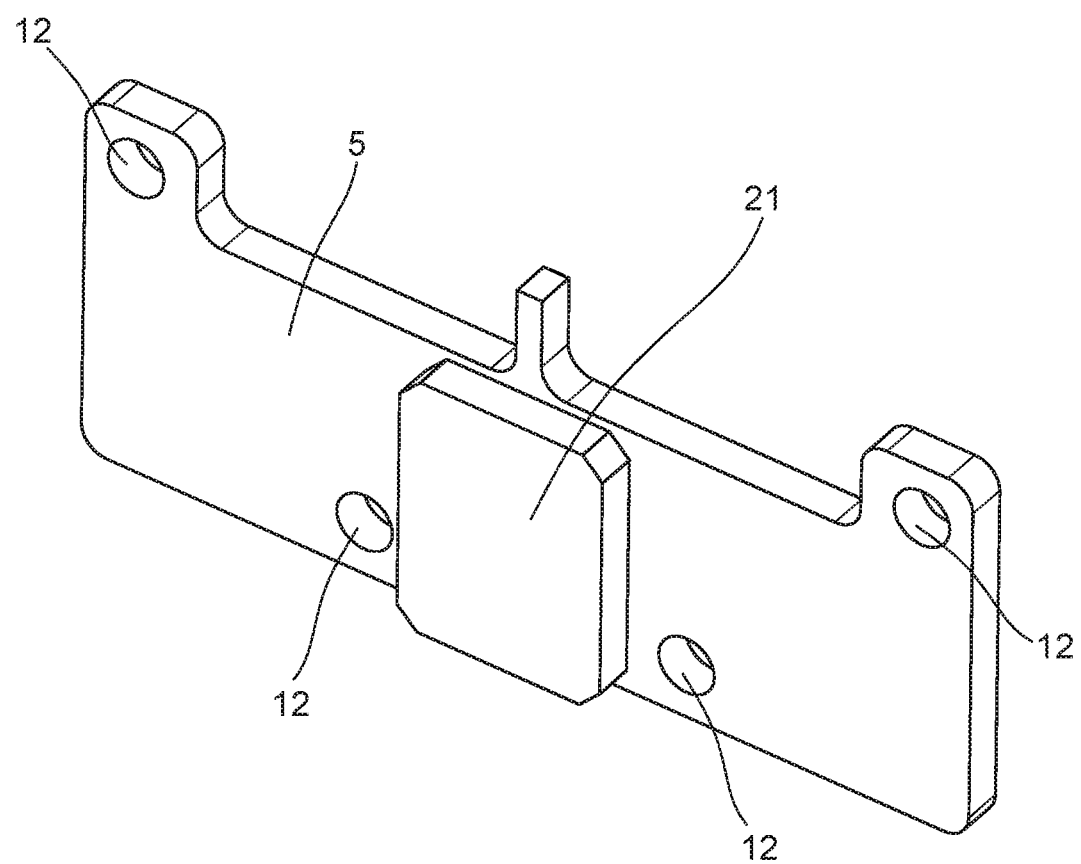
FIG. 4a is a perspective view of a first clamping element.
Figure 4B:
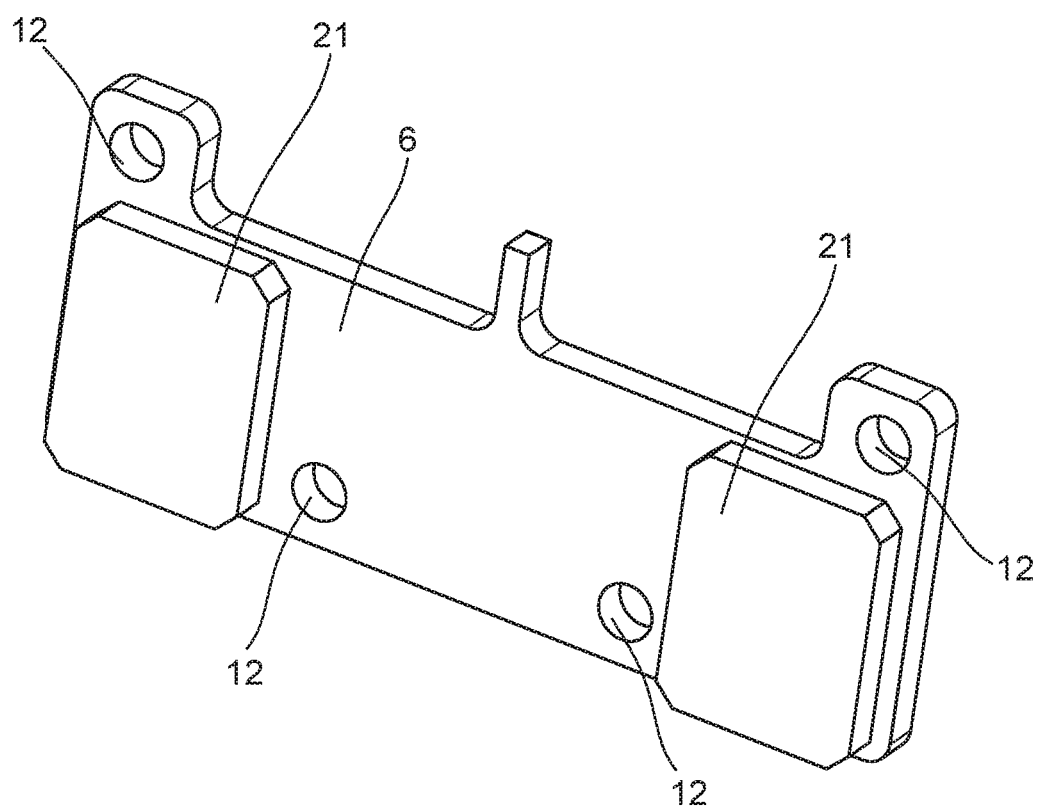
FIG. 4b is a perspective view of a second clamping element.

FIG. 4a shows the first clamping element 5; FIG. 4b shows the second clamping element 6. A contact element 21 is arranged on the first clamping element 5. In the assembled state, the contact element 21 is arranged between the front end 7 of the center stack spark gap 2 and the first clamping element 5. The contact element 21 is connected in an electrically conductive manner to the adjoining electrode 3 of the stack spark gap 2. Two contact elements 21 are arranged on the second clamping element 6, which contact elements are connected in an electrically conductive manner in the assembled state to the adjoining electrodes 3 of the outer stack spark gaps 2. The contact elements 21 are also depicted in FIGS. 1 and 3.

The three stack spark gaps 2, which are arranged beside one another in a parallel manner, are shown in FIG. 5. In the illustrated embodiment, each stack spark gap 2 has twelve electrodes 3. The contact elements 21 are arranged on the front ends 7, which make electrical contact with the clamping elements 5, 6. The connection elements 9 are arranged on the connection sides 10. The connection elements 9 have a contact area 22 and a connection area 23. The contact areas 22 of the connection elements 9 are connected to the adjoining electrodes 3 in an electrically conductive manner. The connection of the stack spark gaps 2 to the corresponding lines is done via the connection areas 23. The contact areas 22 of the connection elements 9 are designed flat in order to form as large a contact surface as possible with the electrodes 3.

The connection areas 23 of the connection elements 9, however, are made angular. Because of the angular design of the connection areas 23, the connection areas 23 can be guided in an elegant way through openings 24 that are made in the insulators 11, 16, 17 on the side of the clamping elements 5, 6 that faces away from the front ends 7. This is depicted especially clearly in FIG. 6, which shows the second clamping element 6 with the second insulating element 17. Two openings 24 are made in the insulating element 17, through which openings the connection areas 23 of the connection elements 9 are guided onto the side of the clamping element 6 that is applied to the front ends 7 of the stack spark gaps 2. In this case, the connection element 9 does not touch the clamping element 6. In order to ensure this, the insulating element 17 extends through the opening 24, as evident in FIG. 1. In the insulating element 17, the recess 18, in which the contact element 21 is arranged, is formed in the center. Moreover, recesses 12 for creating the connecting elements 8 are also formed in the insulating element 17.

Figure 6:
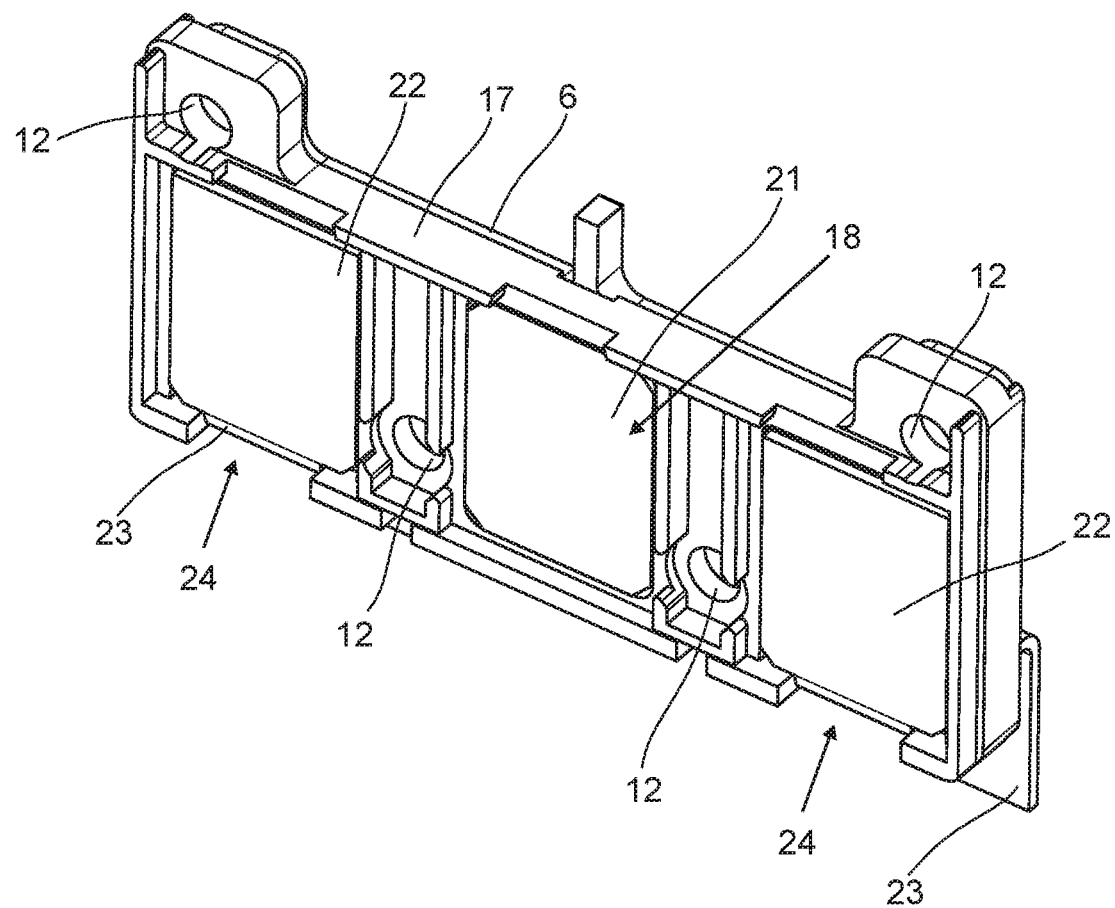
FIG. 6 is a perspective view of parts of the arrangement of stack spark gaps.
Figure 7:
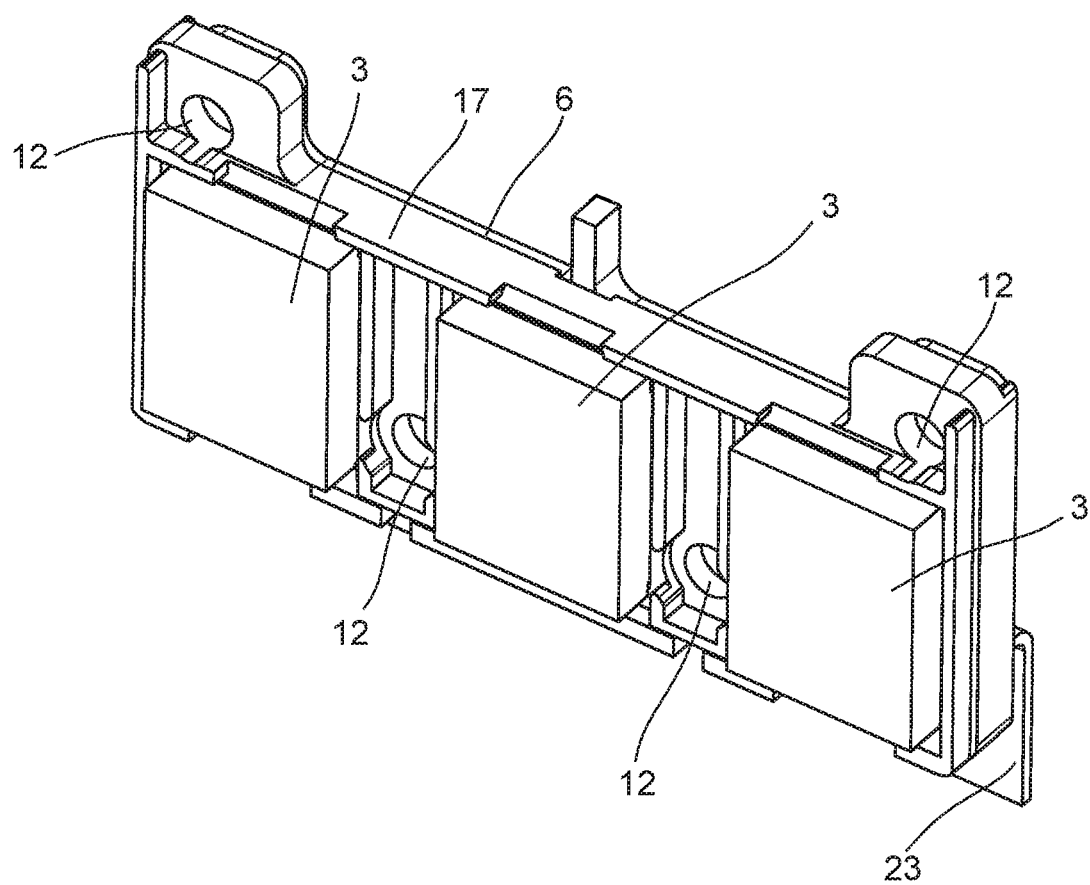
FIG. 7 is a perspective view of the parts, depicted in FIG. 6, of the arrangement with three electrodes.

Besides the elements that are depicted in FIG. 6, FIG. 7, in addition in each case shows an electrode 3 of a stack spark gap 2, i.e., altogether three electrodes, which are arranged beside one another. The two outer electrodes 3 are in this case contacted via the contact area 22 of the connection elements 9 and are electrically insulated against the clamping element 6 by the insulating element 17. The center electrode 3 makes electrical contact with the clamping element 6 via the contact element 21.

The invention claimed is:

1. An arrangement of stack spark gaps, comprising:
a plurality of stack spark gaps each of which has multiple electrodes,
insulating elements that are arranged between the electrodes,
a first electrically conductive clamping element and a second electrically conductive clamping element, the two clamping elements being arranged opposite to one another at front ends of the stack spark gaps,
at least one connecting element, by which the two clamping elements are connected to one another, and
connection elements for electrical connection to the stack spark gaps,
wherein three stack spark gaps are arranged beside one another between the two clamping elements,
wherein the at least one connecting element is electrically conductive, and the two clamping elements are connected to one another electrically via the at least one connecting element,
wherein each stack spark gap has one of its front ends used as a connection side and is connected to one of the connection elements in an electrically conductive manner,
wherein an insulator is arranged between the connection side of each stack spark gap and the one of the two clamping elements that is arranged on the connection side, in such a way that the connection side of each stack spark gap is insulated electrically from the clamping element, and wherein the front end of each stack spark gap that is opposite to the connection side is connected in an electrically conductive manner to the clamping element that is arranged at that end in such a way that the three stack spark gaps form a star circuit.

2. The arrangement according to claim 1, wherein the stack spark gaps are arranged in such a way that the connection sides of two of the stack spark gaps face the first clamping element, and the connection side of a third of the stack spark gaps faces the second clamping element.

3. The arrangement according to claim 2, wherein first and second insulating elements are arranged on the sides of the clamping elements that face the front ends, wherein a recess is formed in the first insulating element through which a front end of one of the stack spark gaps is connected to the first clamping element, and wherein two recesses are formed in the second insulating element, through which the front ends of the two other stack spark gaps are connected to the second clamping element.

4. The arrangement according to claim 3, wherein the insulating elements are frame-shaped, and wherein an outside contour of the insulating elements is matched to an outside contour of the clamping elements, and where the insulating elements project at least partially beyond the clamping elements.

5. The arrangement according to claim 1, wherein a contact element is arranged between each of the front ends of the stack spark gaps that are connected to the clamping elements in an electrically conductive manner and the clamping elements, and each contact element being connected to an adjoining electrode of the respective one of the stack spark gaps in an electrically conductive manner.

6. The arrangement according to claim 1, wherein each of the connection elements has a contact area and a connection area and each connection element is connected via the contact area to an adjoining electrode of a respective one of the stack spark gaps in an electrically conductive manner.

7. The arrangement according to claim 6, wherein the connection area of the connection elements is guided through a respective corresponding opening in the insulator, on a side of the clamping elements that faces away from the stack spark gap, without contacting the clamping elements.

8. Arrangement according to claim 1, wherein the two clamping elements are electrically connected to one another via multiple connecting elements.

9. Arrangement according to claim 1, wherein the at least one connecting element is designed as a screw or bolt and wherein recesses are formed in the clamping elements through which the at least one connecting element at least partially extends.

10. A device for holding together and electrically contacting stack spark gaps, having multiple electrodes and insulators that are arranged between the electrodes, comprising:

a first electrically conductive clamping element and a second electrically conductive clamping element, whereby the clamping elements are arranged opposite to one another, and whereby the stack spark gaps can be clamped between the clamping elements, and at least one connecting element, by which the two clamping elements are connected to one another, wherein the clamping elements enable three stack spark gaps to be positioned beside one another between the two clamping elements, wherein the at least one connecting element is electrically conductive, and the two clamping elements are connected to one another electrically via the connecting element, wherein two insulators are arranged on the first of the two clamping elements, so that two of the stack spark gaps can be arranged in an insulating manner with front ends against the first of the two clamping elements, and wherein one insulator is arranged on a second of the two clamping elements, so that a third one of the stack spark gaps can be arranged in an insulating manner with a front end against the second of the two clamping elements.

11. Device according to claim 10, wherein the two insulators that are arranged on the first of the two clamping elements are formed of a first common insulating element and the insulator that is arranged on the second of the two clamping elements is formed of a second insulating element.

12. Device according to claim 11, wherein a recess is formed in the second insulating element, wherein two recesses are formed in the first common insulating element, wherein the insulating elements are frame-shaped, wherein an outside contour of the insulating elements is matched to an outside contour of the clamping elements, and wherein the insulating elements project at least partially beyond the clamping elements.

13. Device according to claim 12, wherein the insulators have openings for passing through of connection elements of the stack spark gaps.

14. Device according to claim 10, wherein the clamping elements are connected to one another electrically via multiple connecting elements.

15. Device according to claim 10, wherein the at least one connecting element comprises screws or bolts and wherein recesses are formed in the clamping elements through which the connecting elements at least partially extend.

16. Device according to claim 10, wherein a contact element for contacting one of the stack spark gaps is arranged on the first of the two clamping elements, and two contact elements for contacting two stack spark gaps are arranged on the second of the two clamping elements.

* * * * *